Figure 1:
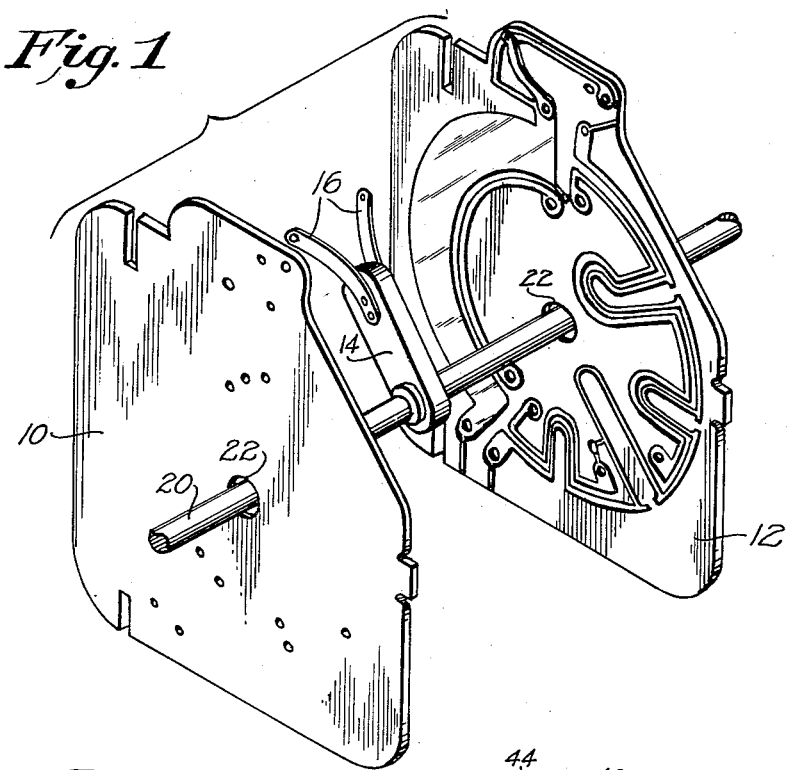

Sept. 11, 1956     C. J. DANIELS ET AL     2,762,113
METHOD OF MAKING TUNER DEVICES
Filed Nov. 3, 1950     4 Sheets-Sheet 1

INVENTORS.
Charles J. Daniels and
John W. Daniels
BY Homer L. Montague
ATTORNEY

Sept. 11, 1956  C. J. DANIELS ET AL  2,762,113
METHOD OF MAKING TUNER DEVICES
Filed Nov. 3, 1950  4 Sheets-Sheet 2

INVENTORS:
Charles J. Daniels and
John W. Daniels,
BY Homer R. Montague
ATTORNEY Sept. 11, 1956  C. J. DANIELS ET AL  2,762,113
METHOD OF MAKING TUNER DEVICES
Filed Nov. 3, 1950  4 Sheets-Sheet 3 after photo-etching after plating after piercing

INVENTORS:
Charles J. Daniels and
John W. Daniels,
BY Homer R. Montague
ATTORNEY after blanking after eyeleting INVENTORS:
Charles J. Daniels and
John W. Daniels,
BY Homer R. Montague
ATTORNEY

United States Patent Office 2,762,113
Patented Sept. 11, 1956

2,762,113
METHOD OF MAKING TUNER DEVICES

Charles J. Daniels and John W. Daniels, Los Angeles, Calif.; said John W. Daniels assignor, by mesne assignments, to Standard Coil Products Co. Inc., a corporation of Illinois Application November 3, 1950, Serial No. 193,989

1 Claim. (Cl. 29—155.5)

This invention pertains to the manufacture of electronic components, and particularly to improvements in the manufacture of components of the "printed" type whereby such parts can be produced rapidly, economically and with a precision heretofore unobtained in mass production.

A principal object of the invention is to provide an improved method for the manufacture of circuit elements comprising conductive portions carried upon or functionally integral with dielectric or insulating plates, such conductive portions having predetermined and desired mechanical and electrical properties, the desired elements being reproducible rapidly and economically within narrow tolerances. Another object of the invention is to provide a method for the manufacture of components of this type in multiple units which may be handled as single parts during a large portion of the time required for their manufacture, whereby to simplify the handling and treating of these multiple units.

Still another object of the invention is to provide an improved manufacturing technique for printed circuit elements of the flat plate type in which the known techniques of photo-etching and punching, stamping or cutting are so interrelated that the mechanical tooling is greatly simplified, so that design changes may be accomplished with a minimum of waste in so far as the manufacturing setup is concerned.

As an aid to the understanding of the present invention, and of its importance from the manufacturing standpoint, it is desired to point out that while the use of "printed circuit" techniques in the fabrication of electrical parts and assemblies is not new, and has been suggested by many writers and inventors, the successful application of such techniques on a mass production scale has been severely limited by technological considerations. The variety of methods which may theoretically be employed to produce electrical components of the "printed" type may be apprehended by referring to circular No. 468 of the U. S. Bureau of Standards, issued November 15, 1947, and entitled, "Printed Circuit Techniques," and to Miscellaneous Publication No. 192 issued by the same bureau on November 22, 1948 and entitled, "New Advances in Printed Circuits." The difficulties involved in applying many of these techniques to mass production quantities will be apparent, but an example may be of aid in visualizing the problem. If it be desired to produce a large quantity of duplicate insulating plates each provided with duplicate ptterns of conductive areas, it has been suggested that the dielectric plates themselves may first be die stamped from sheet stock in an ordinary punch press, metallic elements having the desired configuration may then likewise be stamped from thin sheet metal, and these metallic patterns secured to the insulating plates by suitable adhesives. It is apparent that the implementation of such a process is considerably more expensive than the conventional assembly techniques of the radio industry. In the first place, metal stamping dies and punches peculiar to the particular configurations of conductive material are required, and these are not only expensive to manufacture, but also either expensive or impossible of alteration when design changes alter the desired metallic configuration. Also, the problem of obtaining proper placement of the metallic portions upon the insulating support plates is extremely difficult of solution on a mass production basis.

It has also been suggested that a flat component of the type mentioned above may be obtained by spraying conductive material through a stencil having the desired pattern and thence upon the insulating base material, but experience has shown that the maintenance of precision in the sprayed pattern requires a new unused stencil for the production of each plate. Thus, stamping dies having the desired configuration are still a necessity, and while they need only stamp stencil material (rather than metal), the cost of changes is still prohibitive. Moreover, the cost of metal spraying equipment and the labor involved in its operation is extremely high as compared with more conventional manufacturing techniques.

We have discovered that by a proper combination of techniques of the printed circuit type with conventional punching and stamping operations, it is possible to provide for the rapid, economical, and flexible manufacture of electrical and electronic circuit elements without any of the drawbacks noted above, and that components so produced can be held to very narrow mechanical and electrical tolerances. In order fully to disclose our invention, so that it may be understood and practiced by others, we will describe herein the application of our process to the manufacture of tunable transmission lines of the type utilized in a novel high-frequency tuning unit described and claimed in the copending applications of Carlton Wasmansdorff, Ser. No. 70,747, filed January 13, 1949, and Serial No. 80,310, filed March 8, 1949, now Patent 2,627,579; both of these applications are owned by the assignee of the present invention. It is to be understood that our disclosure of the novel manufacturing process involved in the production of these transmission line units is only for purposes of illustration, and that the same process may be utilized in the production of circuit elements of other types and configurations.

In connection with the detailed description of the process, we shall refer to the accompanying drawings, in which:

Fig. 1 is an exploded view of a single tunable transmission line of the type whose manufacture is to be described.

Figure 2:
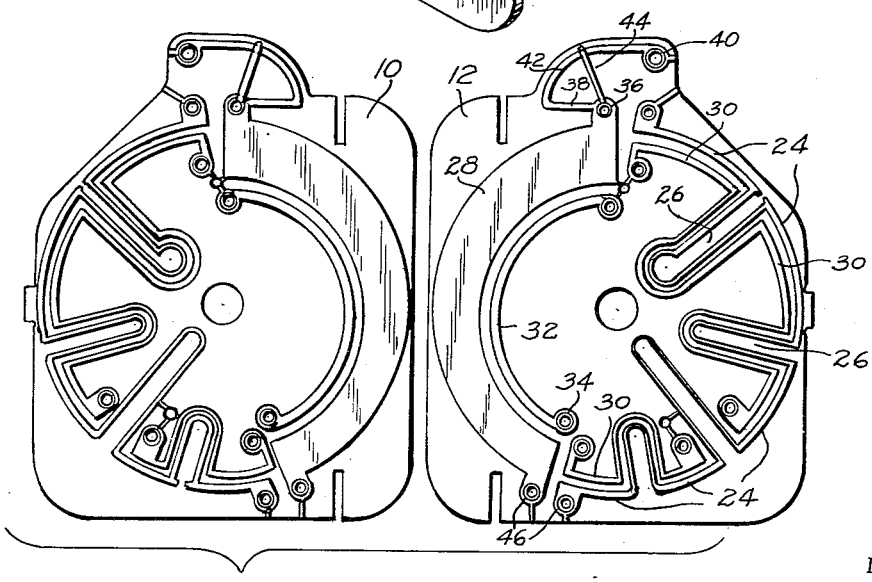
Figure 3:
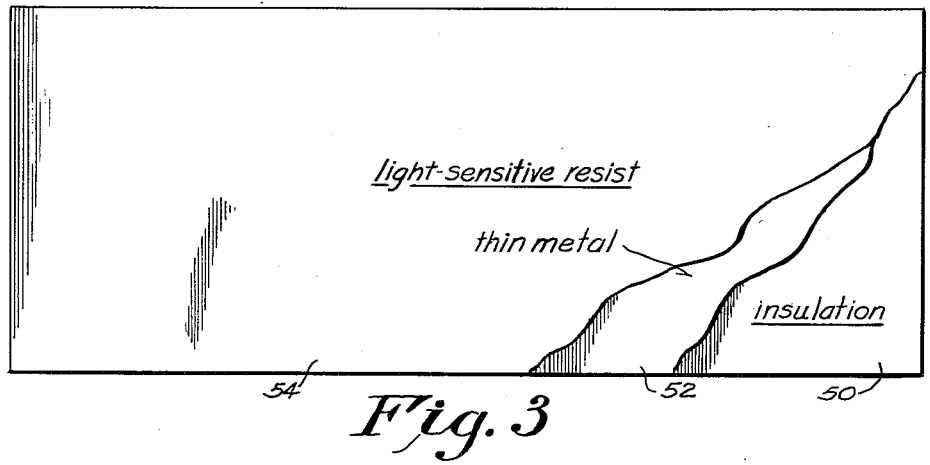
Figure 4:
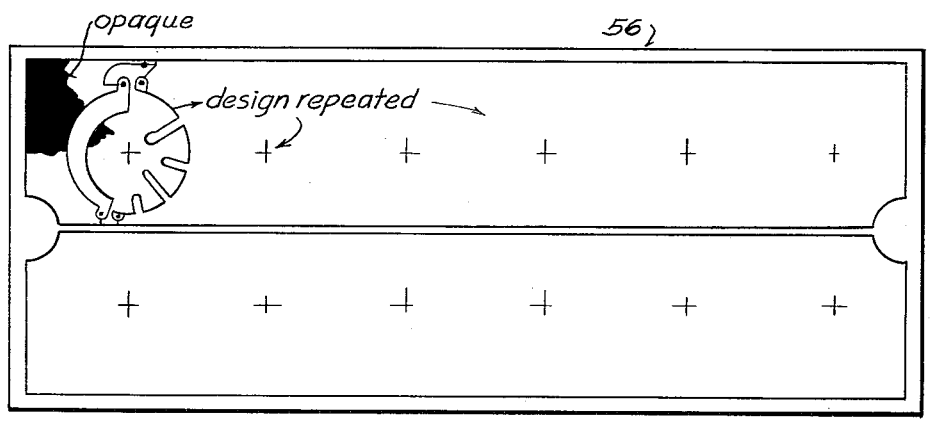
Figure 5:
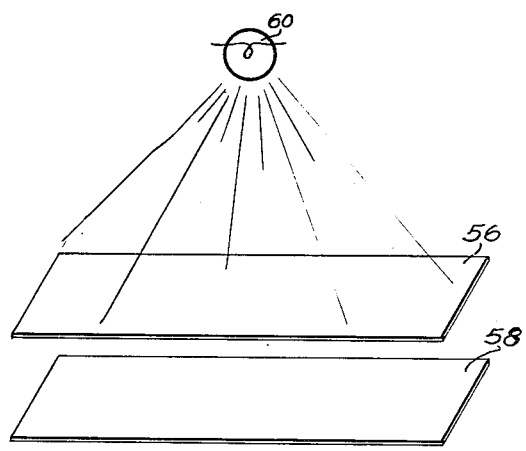
Figure 6:
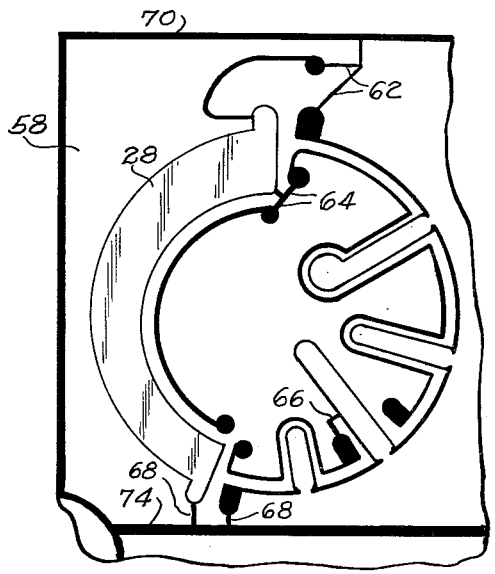
Figure 7:
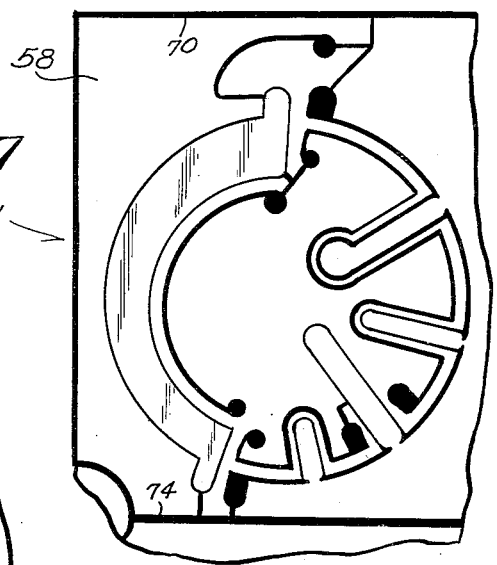
Figure 8:
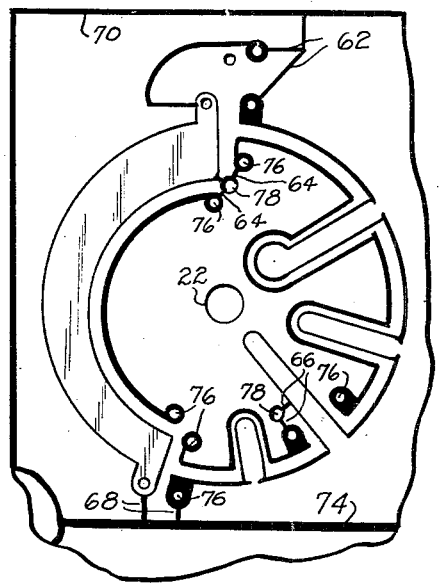
Figure 9:
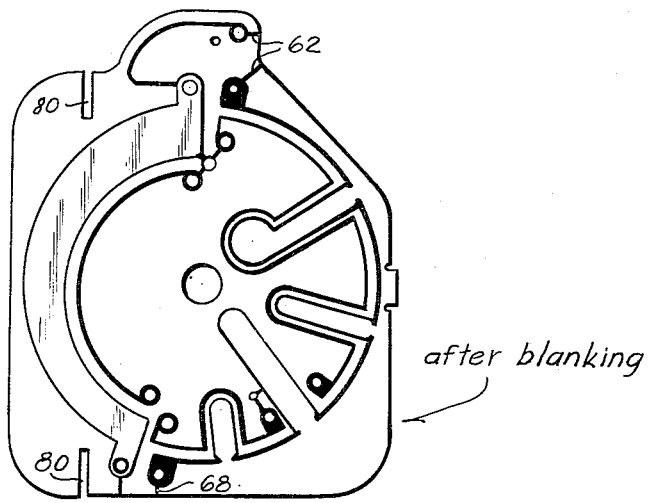
Figure 10:
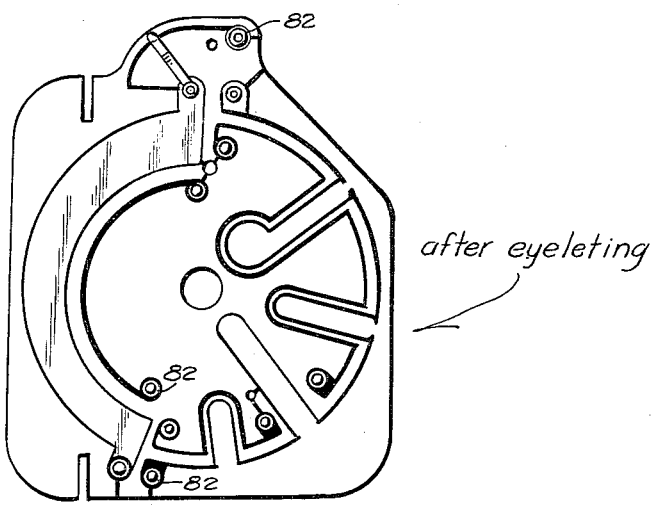

Fig. 2 is a plan view showing the two insulating plates of Fig. 1 lying side by side as they would be if one of the plates of Fig. 1 were turned over so as to be coplanar with the other, Fig. 3 is a plan view of a sheet of insulating material bearing a coating of conductive material (partly broken away to show the laminar nature of the sheet), Fig. 4 is a plan view of a master drawing representing the desired configuration of conductive material to be produced upon an insulating base, Fig. 5 is a perspective view illustrating the method by which a plurality of images of the desired shape are impressed upon the plate of Fig. 3 by a photo-etch process, Fig. 6 is a plan view of a portion of the sheet of Fig. 3 after completion of the photo-etch process, Fig. 7 is a plan view of a similar portion of the sheet of Fig. 3 after the metallic portions have been plated, Fig. 8 is a similar view of the same sheet portion after removal of undesired electrical connections, Fig. 9 is a plan view of a single one of the finished elements after blanking from the sheet of Fig. 3, and Fig. 10 is a plan view of a finished unit to which connecting eyelets have been applied.

Referring now to Fig. 1 of the drawings, there is shown diagrammatically in exploded view a unit comprising one of the tunable transmission lines of the type shown in the above mentioned copending applications. Such a unit comprises a pair of plates 10 and 12 which, as better illustrated in Fig. 2, are enantiomorphically related as to their shape and the conductive patterns carried thereby. In an actual assembly, the two plates 10 and 12 are secured in face-to-face relationship and about a half-inch apart, so that their conductive areas may be bridged by a suitable contact element 14 carrying contact fingers 16 which are springy so as to insure proper contact between these contact elements and the generally arcuate portions of the conductive areas of plates 10 and 12. This contact element 14 is fixed for rotation with (but insulated from) a shaft 20 which passes freely through apertures 22 in the plates. In an actual tuning unit, a plurality of sets of these transmission line elements are employed, the contact elements for the different sets being insulated from shaft 20 but secured thereto for ganged operation by said shaft. Also, in a complete tuning unit utilizing several sets of these plates, the conductive patterns on plates of different sets will usually be somewhat different from one another, in accordance with the particular requirements of the circuits to which they are in practice connected. However, for purposes of disclosure of the process of our invention, it will be sufficient to describe in detail the manufacture of one type of plate, and the application of these principles to other elements and configurations will be obvious from such disclosure.

Referring now to the plate 12 shown at the right of Fig. 2 of the drawings, it will be seen that the conductive pattern thereon includes arcuate portions 24 lying on a circle concentric with aperture 22, there being five of these portions 24 to make a total angular extent of about 180°. The adjacent ends of these arcuate portions are electrically connected by inductive loops 26 which extend inwardly toward the aperture 22. The remaining 180° of the circle is largely occupied by a single band 28 of conductive material whose outer edge is concentric with aperture 22 and whose inner edge, while generally arcuate, is eccentric to aperture 22 to provide a taper in the width in the portion 28 for a purpose clearly described in the above mentioned application Serial No. 80,310.

Lying within the inner edge of each of the arcuate portions just described is a secondary pattern of conductive material. This secondary pattern lies within the arcuate portions 24 and comprises parallel arcuate portions 30, also connected between their respective ends by loops extended inwardly toward aperture 22, and in the case of strip 28 the secondary pattern is a continuous arc 32 paralleling the inner edge of said strip. Eyelets 34 are provided to terminate certain of the pattern areas just described to enable electrical connections to be made by soldering or the like.

In the case of the upper termination of strip 28, it will be observed that an outwardly extending tongue 36 is connected by a line 38 to an eyelet 40, and that a portion 42 of this line forms a quadrant of a circle having its center at the tongue 36. A rotatable spring contact finger 44 is pivoted at tongue 36 and arranged to rotate along line portion 42 so as to permit a fine adjustment of the effective electrical length of the strip 28.

In use, appropriate signal input connections are made to the inner strips such as 30 and 32, and the contact fingers 16 are adjusted by shaft 20 so as to contact different peripheral portions of the outer arcuate elements such as 24 and 28, all in accordance with principles set forth in the above mentioned applications. Said applications also explain the reason for providing the substantially circular transmission line with external connections 46 at points about half way along the length (that is, near the bottoms of the plates shown in Fig. 2).

Our invention is concerned with the rapid, economical and accurate fabrication of the plates 10 carrying the conductive areas above described, and to this end we utilize a refinement of a photo-etching process. In brief, the starting point of our process is a sheet of insulating material which may have a thickness of the order of .050 inch and which may for example be a rigid plastic material such as Bakelite. One surface of this sheet has applied thereto an all-over coating or lamination of a conductive material; for example, a thin sheet or foil of copper may be bonded to the insulating sheet by the use of an adhesive, hot pressing or the like. After application, the copper sheet (which may have a thickness of the order of .0015 inch) is cleaned thoroughly as by washing with powdered pumice and water, and then coated with "cold top" enamel, such as is well known in the photo-engraving art. Such an enamel, for example, may comprise a light-sensitive resist material such as bichromated gelatin, which has the property of being hardened and rendered comparatively insoluble in water after exposure to light.

Figure 3 of the drawings illustrates the composite sheet just described, and in that figure numeral 50 designates the insulating base sheet such as a high-grade paper-base impregnated Bakelite sheet. Numeral 52 designates the thin overlay of copper, and numeral 54 designates the coating of cold top enamel.

In order to produce the described pattern of conductive material (herein copper) on the composite sheet, a master such as shown in Figure 4 is prepared. This master 56 may be an accurate drawing corresponding to the configuration of a plurality of plates 10. The areas representative of the conductive portions of the finished plate 10 are relatively transparent, while the remaining areas of the master are relatively opaque. Such a master may be obtained by making a photographic negative of an accurate ink drawing of the desired configuration or pattern, and its preparation may utilize well known photographic techniques, such as enlargement or reduction from an original ink drawing. However, it is to be understood that the method of preparing master 56 is not a feature of the present invention.

As shown in Figure 4, for reasons of economy the master may carry a plurality (such as 12) of the patterns required for plates 10, thus enabling the processing to be carried on with a minimum of handling of individual plates. Referring now to Figure 5, the step of exposing the composite sheet (designated 58) of Figure 3 to a light source 60 through the master 56 is illustrated. For purposes of clarity, sheets 56 and 58 are shown as spaced apart, but ordinarily the master 56 would be in intimate contact with sheet 58 to provide a sharp delineation of the images carried by the master upon the light sensitive surfaces of the sheet 58. However, it will be apparent to those skilled in the art of photo-engraving that a projection printing, enlarging or reducing system could equally well be used. The light source 60 is illustrated only diagrammatically, and it may comprise either an incandescent light or a source rich in ultra-violet, depending upon the particular light-sensitive material with which sheet 58 is coated.

In accordance with the preferred process, after plate 58 has received a suitable exposure through the master it is washed or developed with alcohol and then with water, which operates to remove from the plate those portions of the cold top enamel which have not been exposed to light, and which have therefore not been rendered insoluble in the alcohol and water. The plate 58, which now bears a pattern of cold top enamel covering those areas where the copper sheet 52 is to remain, is now subjected to a baking operation whose object is further to set the enamel and protect the underlying metal during subsequent operations.

These subsequent operations include the step of subjecting at least the top surface of plate 58 to a solution of iron chloride which attacks and dissolves away the unprotected copper lying outside the areas covered and protected by the hardened cold top enamel, whereupon the plate is again washed with powdered pumice and water to remove the etching fluid and the remaining cold top enamel. This leaves the plate with a pattern as shown in Figure 6, in which the desired configuration of conductive material (copper) is visible as a design upon the insulating base 50.

In order to provide a durable and quiet electrical contact between the shorting fingers 16 and the metallic pattern of the plate, it is desirable to silver-plate the conductive copper pattern, and such plating also provides reduced resistance in the pattern areas, which is particularly important where radio frequencies are being handled. Since, however, in the finished plates 10 the various conductive areas are electrically distinct from one another, separate connections would have to be made to each of these distinct conductive areas of plate 58; we therefore temporarily interconnect all of these conductive portions by lines of metal which are afterwards open-circuited to accomplish the necessary electrical separation of the pattern areas. We prefer to accomplish this by providing a master or negative 56 which has, in addition to the transparent areas desired in the final plates, additional transparent lines which will produce these temporary interconnections between all of the conductive portions of the plate 58. As shown in Figure 6, these temporary interconnections are illustrated by numerals 62, 64, 66, and 68, comprising relatively narrow conductive strips which join all the conductive portions of the pattern to one another and to borderlines 70 or to a longitudinal wider strip 74 in the nature of a bus. These same temporary interconections are illustrated in Figure 7, which represents one corner of a sheet 58 after the metallic areas have been silver-plated in a conventional electroplating bath. The areas 74 of conductive material may be utilized for the attachment of the electrodes in the plating process.

The finished multi-unit plates 58 are then pierced or perforated, for example, in a drill press or a punch press equipped with suitable punching dies, to provide the apertures for the shaft (such an aperture being designated by numeral 22), the apertures 76 which are later to receive eyelets, and additional apertures 78 whose purpose is to interrupt the electrical continuity of the temporary interconnections such as those designated by numerals 64 and 66. After this piercing or punching operation, the sheets are blanked to separate the individual unit plates 10 therefrom, and to provide the desired profile. This blanking operation (which might also be accomplished by sawing) also serves to interrupt the continuity of the other temporary interconnections 62 and 68. The unit plate which has passed through the blanking stage is shown in Figure 9, in which numeral 80 designates slots which are provided to receive locating struts serving to hold a plurality of the finished unit plates in proper face-to-face relationship.

Figure 10 illustrates a unit plate of the type shown in Figure 9 after there have been secured thereto the eyelets 82 which enable external connections to be made to the individual conductive areas of such unit plate.

It will be seen from the above disclosure that we have provided an efficient and economical system and process for the large scale production of electrical units suitable for many purposes, and in which the various steps cooperate in a novel manner to facilitate and render reliable the various steps in the process. We are aware that the preparation of electrical components by photo-etch processes has long been known, and we do not claim such a process broadly as our invention. However, so far as we know, it has never before been proposed to interrelate photographic and mechanical operations in such a way, for example, as to facilitate the electroplating of conductive portions of the apparatus. It is clear that the process according to the invention could be modified in various non-inventive ways without departing from the spirit of our invention, and we therefore do not desire to be limited to the specific details described above, but only by the scope of the appended claim.

We claim:

The process of forming tuner devices each having a plurality of separate inductive elements having different values of inductance on an insulating base comprising the steps of applying a coating of conductive material on said insulating base formed for a plurality of individual tuner devices to form said separate inductive elements and connecting links between said inductive elements for each tuner device, including common conductive buses extending between adjacent tuner devices, of applying a single electrode to the said conductive coating and electro plating said coating wherein current flows through said buses to individually tuner devices, and thereafter of removing said connecting links and buses to provide the desired final form of said tuner devices having separate inductive elements, the said removal being obtained by piercing said electro plated areas at points covered by said connecting links and by severing said buses from said base and severing said tuner devices from each other and of applying conductive eyelets to terminal portions of said inductive elements.

References Cited in the file of this patent
UNITED STATES PATENTS

| | | |
|---|---|---|
| 1,563,731 | Ducas | Dec. 1, 1925 |
| 1,794,831 | Caruso | Mar. 3, 1931 |
| 2,006,553 | Hennegan | July 2, 1935 |
| 2,014,524 | Franz | Sept. 17, 1935 |
| 2,399,753 | McLarn | May 7, 1946 |
| 2,433,384 | McLarn | Dec. 30, 1947 |
| 2,451,725 | Franklin | Oct. 19, 1948 |
| 2,464,377 | Cohen et al. | Mar. 15, 1949 |
| 2,474,988 | Sargrove | July 5, 1949 |
| 2,566,666 | Khouri et al. | Sept. 4, 1951 |
| 2,613,252 | Heibel | Oct. 7, 1952 |
| 2,699,424 | Nieter | Jan. 11, 1955 |

FOREIGN PATENTS

| | | |
|---|---|---|
| 602,492 | Great Britain | May 27, 1948 |

OTHER REFERENCES

Product Engineering, April 1948, page 158.